(12) United States Patent
Huang

(10) Patent No.: US 9,007,547 B2
(45) Date of Patent: Apr. 14, 2015

(54) BACKLIGHT MODULE AND LCD DEVICE

(75) Inventor: Jian-Fa Huang, Shenzhen (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 58 days.

(21) Appl. No.: 13/380,853

(22) PCT Filed: Dec. 5, 2011

(86) PCT No.: PCT/CN2011/083492
§ 371 (c)(1),
(2), (4) Date: Dec. 25, 2011

(87) PCT Pub. No.: WO2013/075368
PCT Pub. Date: May 30, 2013

(65) Prior Publication Data
US 2013/0128190 A1 May 23, 2013

(30) Foreign Application Priority Data
Nov. 23, 2011 (CN) .......................... 2011 1 0376570

(51) Int. Cl.
*G02F 1/1335* (2006.01)
*G09F 13/18* (2006.01)
*F21V 8/00* (2006.01)
*F21V 1/00* (2006.01)
*F21V 11/00* (2006.01)
*F21V 7/00* (2006.01)
(Continued)

(52) U.S. Cl.
CPC .............. *G09F 13/18* (2013.01); *G02B 6/0011* (2013.01); *G02B 6/0031* (2013.01); *G02B 6/0085* (2013.01); *G02B 6/0091* (2013.01)

(58) Field of Classification Search
None
See application file for complete search history.

(56) References Cited

U.S. PATENT DOCUMENTS 6,955,460 B2 * 10/2005 Kim ............................ 362/620
7,967,462 B2 * 6/2011 Ogiro et al. .................. 362/97.2
(Continued)

FOREIGN PATENT DOCUMENTS

CN 1908762 A 2/2007
CN 101865376 A 10/2010
(Continued)

OTHER PUBLICATIONS

Joseph Ogando, Thermally Conductive Plastics Beat the Heat, Sep. 17, 2001, Design News.*
(Continued)

*Primary Examiner* — Bumsuk Won
*Assistant Examiner* — Angela Davison
(74) *Attorney, Agent, or Firm* — Cheng-Ju Chiang

(57) ABSTRACT

A backlight module is disclosed, which comprises a light guide plate, a point light source and a substrate. The light guide plate comprises a top surface and a bottom surface opposite to each other and a side surface located between the top surface and the bottom surface. The point light source is disposed on the substrate. The backlight module further comprises a backplate, a front frame and a first reflective unit. The backplate is adapted to accommodate the light guide plate. The front frame is disposed adjacent to the top surface of the light guide plate. The point light source is disposed adjacent to the side surface. A bisector line of a light emitting range of the point light source is directed towards a plane in which the top surface or the bottom surface of the light guide plate is located.

4 Claims, 4 Drawing Sheets

(51) Int. Cl.
*F21V 7/04* (2006.01)
*H01J 5/16* (2006.01)
*H01J 61/40* (2006.01)
*H01K 1/26* (2006.01)
*H01K 1/30* (2006.01)

(56) References Cited

U.S. PATENT DOCUMENTS

| | | | |
|---|---|---|---|
| 2004/0061814 A1* | 4/2004 | Kim et al. | 349/65 |
| 2006/0091819 A1* | 5/2006 | Li et al. | 315/209 R |
| 2006/0215075 A1* | 9/2006 | Huang et al. | 349/67 |
| 2006/0290844 A1 | 12/2006 | Epstein et al. | |
| 2008/0062686 A1* | 3/2008 | Hoelen et al. | 362/240 |
| 2008/0170177 A1* | 7/2008 | Chen | 349/64 |
| 2011/0273906 A1* | 11/2011 | Nichol et al. | 362/607 |

FOREIGN PATENT DOCUMENTS

| | | |
|---|---|---|
| CN | 101975361 A | 2/2011 |
| CN | 201954400 U | 8/2011 |
| CN | 202056691 U | 11/2011 |
| JP | 2006-269289 A | 10/2006 |
| TW | 200848823 A | 12/2008 |
| WO | 2008/083018 A1 | 7/2008 |

OTHER PUBLICATIONS

Jim Miller, Thermally Conductive Polymers Delete the Heat, May 3, 2001, Machine Design.*
Definition of "adjacent," Webster's Third New International Dictionary, Unabridged (on-line version), 1993.*
Definition of "light guide," Light Guide Techniques, Using LED Lamps, Application Brief I-003, Avago Technologies, 2006.*

* cited by examiner

BACKLIGHT MODULE AND LCD DEVICE

FIELD OF THE INVENTION

The present disclosure generally relates to a backlight module, and more particularly, to a backlight module with a point light source; and the present disclosure further relates to a liquid crystal display (LCD) device comprising the backlight module.

BACKGROUND OF THE INVENTION

Owing to their advantages such as having a low radiation level, a light weight, a thin profile and low power consumption, liquid crystal display (LCD) devices have found wide applications in mobile phones, personal digital assistants (PDAs), notebook computers, personal computers (PCs), TV sets and the like. Because liquid crystal molecules in an LCD panel do not emit light by themselves, an area light source device (e.g., a backlight module) must be provided for the LCD panel in order to accomplish the displaying function. The area light source device is mainly used to provide an area light source with sufficient and uniformly distributed luminance for the LCD panel.

In order to satisfy the requirements on energy consumption, durability and environmental protection, high-performance light emitting diodes (LEDs) have been used in backlight modules to gradually replace the conventional cold cathode fluorescent lamps (CCFLs) as a primary choice. Currently, there are mainly two types of backlight modules that adopt LEDs, the direct-lit type and the edge-lit type. Backlight modules of the direct-lit type feature a simple structure, high luminance, a desirable heat dissipation effect and a small frame, but have the main shortcomings that they require use of a large number of LEDs, have a high cost and tend to present non-uniform luminance and colors and, moreover, make the whole backlight module thick and bulky.

As compared with the backlight modules of the direct-lit type, backlight modules of the edge-lit type overcome the aforesaid shortcomings, but also have shortcomings that the frame is relatively wide and LED lamp shadows or muras can be easily seen at the side edges. Currently in the mainstream edge-lit backlight module structure, LEDs are soldered onto a printed circuit board (PCB) to form a light bar disposed along a side edge of a light guide plate (LGP) and are then fixed to an aluminum extruded piece for heat dissipation. This structure has the following main problems.

Firstly, because the LEDs are disposed at the side edge of the light guide plate, collisions between the LEDs and the light guide plate occur easily. Particularly when the backlight module is handled or impacted, accidental collisions between the LEDs and the light guide plate may cause damage to the LEDs.

Secondly, the thicknesses of the LEDs, the PCB and the aluminum extruded piece add to each other at the side edge of the light guide plate in a direction perpendicular to a side surface of the light guide plate, which makes the whole thickness of the backlight module of the edge-lit type relatively large. Consequently, a wide frame must be used to accommodate the increased thickness, and this is in contradiction to the development tendency towards a narrow frame.

Thirdly, heat generated by the LEDs during operation must be timely dissipated outwards. The heat dissipation path for the LEDs passes through the PCB, a side edge of the aluminum extruded piece and a bottom surface of the aluminum extruded piece to the backplate. Such a long heat dissipation path leads to low heat dissipation efficiency, and the heat that cannot be dissipated timely may have an adverse effect on other elements of the LCD device or even cause degradation in the displaying quality.

SUMMARY OF THE INVENTION

In order to overcome the problems that the prior art backlight modules have a wide frame and poor heat dissipation efficiency, an objective of the present disclosure is to provide a backlight module that has a narrow frame and can dissipate heat easily.

Another objective of the present disclosure is to provide a liquid crystal display (LCD) device comprising this backlight module.

To achieve the aforesaid objectives, the present disclosure provides a backlight module, which comprises a light guide plate, a point light source and a substrate. The light guide plate comprises a top surface and a bottom surface opposite to each other and a side surface located between the top surface and the bottom surface. The point light source is disposed on the substrate. The backlight module further comprises a backplate, a front frame and a first reflective unit. The substrate makes direct contact with the backplate. The backplate is adapted to accommodate the light guide plate. The front frame is disposed adjacent to the top surface of the light guide plate. The point light source is disposed adjacent to the side surface. A bisector line of a light emitting range of the point light source is directed towards a plane in which the top surface of the light guide plate is located. The bisector line is parallel to or includes an acute angle with a plane in which the side surface of the light guide plate is located. The first reflective unit is adapted to reflect light emitted from the point light source into the light guide plate. A reflective surface of the first reflective unit is a parabolic surface. The point light source is disposed at a focus of the parabolic surface.

According to a preferred embodiment of the present disclosure, a top portion of the first reflective unit is located between the bottom surface of the light guide plate and a bisector plane of the light guide plate, and the bisector plane of the light guide plate is parallel to the top surface of the light guide plate and located at a half thickness of the light guide plate.

According to a preferred embodiment of the present disclosure, the backlight module further comprises a second reflective unit disposed around side edges of the point light source below the light emitting range.

To achieve the aforesaid objectives, the present disclosure provides a backlight module, which comprises a light guide plate, a point light source and a substrate. The light guide plate comprises a top surface and a bottom surface opposite to each other and a side surface located between the top surface and the bottom surface. The point light source is disposed on the substrate. The backlight module further comprises a backplate, a front frame and a first reflective unit. The backplate is adapted to accommodate the light guide plate. The front frame is disposed adjacent to the top surface of the light guide plate. The point light source is disposed adjacent to the side surface. A bisector line of a light emitting range of the point light source is directed towards a plane in which the top surface or the bottom surface of the light guide plate is located. The first reflective unit is adapted to reflect light emitted from the point light source into the light guide plate.

According to a preferred embodiment of the present disclosure, the bisector line of the light emitting range of the point light source is parallel to or includes an acute angle with a plane in which the side surface of the light guide plate is located.

According to a preferred embodiment of the present disclosure, the substrate makes direct contact with the backplate when the bisector line of the light emitting range of the point light source is directed towards the plane in which the top surface of the light guide plate is located.

According to a preferred embodiment of the present disclosure, a top portion of the first reflective unit is located between the bottom surface of the light guide plate and a bisector plane of the light guide plate when the bisector line of the light emitting range of the point light source is directed towards the plane in which the top surface of the light guide plate is located, and the bisector plane of the light guide plate is parallel to the top surface of the light guide plate and located at a half thickness of the light guide plate.

According to a preferred embodiment of the present disclosure, the backlight module comprises a second reflective unit when the bisector line of the light emitting range of the point light source is directed towards the plane in which the top surface of the light guide plate is located, and the second reflective unit is disposed around side edges of the point light source below the light emitting range.

According to a preferred embodiment of the present disclosure, a reflective surface of the first reflective unit is a parabolic surface, and the point light source is disposed at a focus of the parabolic surface.

According to a preferred embodiment of the present disclosure, the substrate makes direct contact with the front frame when the bisector line of the light emitting range of the point light source is directed towards the plane in which the bottom surface of the light guide plate is located.

According to a preferred embodiment of the present disclosure, the substrate comprises a printed circuit board (PCB) and an aluminum extruded piece in contact with each other, and the point light source and the aluminum extruded piece are located at two opposite sides of the PCB respectively.

According to a preferred embodiment of the present disclosure, when the bisector line of the light emitting range of the point light source is directed towards the plane in which the top surface of the light guide plate is located and includes an acute angle with the plane in which the bottom surface of the light guide plate is located, a sum of an inclination angle of the point light source with respect to the bottom surface of the light guide plate and an inclination angle of the reflective surface of the first reflective unit with respect to the bottom surface of the light guide plate is 90°.

According to a preferred embodiment of the present disclosure, the point light source is disposed corresponding to a lower end of the side surface of the light guide plate.

According to a preferred embodiment of the present disclosure, the bisector line of the light emitting range of the point light source includes an angle of 45° with the side surface of the light guide plate.

To achieve the aforesaid objectives, the present disclosure further provides an LCD device, which comprises a backlight module. The backlight module comprises a light guide plate, a point light source and a substrate. The light guide plate comprises a top surface and a bottom surface opposite to each other and a side surface located between the top surface and the bottom surface. The point light source is disposed on the substrate. The backlight module further comprises a backplate, a front frame and a first reflective unit. The backplate is adapted to accommodate the light guide plate. The front frame is disposed adjacent to the top surface of the light guide plate. The point light source is disposed adjacent to the side surface. A bisector line of a light emitting range of the point light source is directed towards a plane in which the top surface or the bottom surface of the light guide plate is located. The first reflective unit is adapted to reflect light emitted from the point light source into the light guide plate.

The present disclosure has the following benefits: as compared to the prior art, the backlight module and the LCD device of the present disclosure have the thicknesses of a plurality of elements including the point light source and the PCB superposed on each other in a direction parallel to or inclined with respect to a side surface of the light guide plate to reduce the frame width of the backlight module. Furthermore, this can simplify the heat dissipation path of heat generated by the point light source, improve the heat dissipation efficiency and prevent accidental collisions between the light guide plate and the point light source. Therefore, the backlight module and the LCD device of the present disclosure feature a narrow frame and can dissipate heat easily.

BRIEF DESCRIPTION OF THE DRAWINGS

The attached drawings are provided to facilitate better understanding of the present disclosure and, in conjunction with the detailed description of the present disclosure, explain the present disclosure, but are not intended to limit the disclosure.

DETAILED DESCRIPTION OF THE INVENTION

Figure 1:
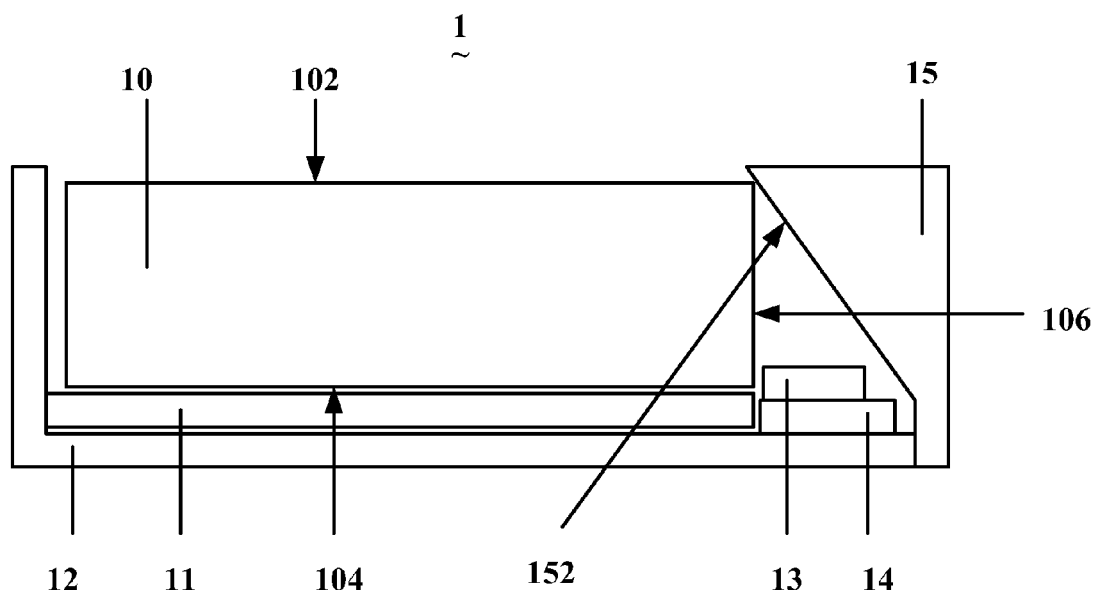
FIG. 1 is a schematic side view of a first embodiment of a backlight module according to the present disclosure.

Various embodiments of the disclosure are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

Referring to FIG. 1, there is shown a schematic side view of a first embodiment of a backlight module according to the present disclosure. The backlight module 1 comprises a light guide plate 10, a reflective sheet 11, a backplate 12, a point light source 13, a printed circuit board (PCB) 14 and a baffle 15.

The light guide plate 10 comprises a top surface 102, a bottom surface 104 and side surfaces 106. The top surface 102 acts as a light exiting surface of the light guide plate 10. The bottom surface 104 and the top surface 102 are disposed opposite to each other. The side surfaces 106 are disposed between the top surface 102 and the bottom surface 104, and one of the side surfaces 106 acts as a light incident surface of the light guide plate 10. The light guide plate 10 may be made of polymethyl methacrylate (PMMA) or polycarbonate (PC).

The reflective sheet 11 is disposed adjacent to the bottom surface 104 of the light guide plate 10, and mainly functions to reflect light emitted from the bottom surface 104 of the light guide plate 10 back into the light guide plate 10 so as to increase the light utilization ratio of the backlight module 1.

The backplate 12 is a metal backplate, and mainly has supporting and accommodating functions as well as the heat dissipation function. In this embodiment, the backplate 12 accommodates the light guide plate 10 and the reflective sheet 11.

Figure 2:
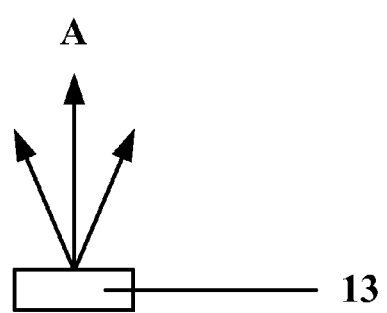
FIG. 2 is a schematic view illustrating a light emitting direction of a point light source in the first embodiment of the backlight module according to the present disclosure.

The point light source 13 is a light emitting diode (LED), and has a certain light emitting directivity and a light emitting range. Referring to FIG. 2 together, a bisector line A of the light emitting range of the point light source 13 extends from the point light source 13 towards a light emitting direction, and the light emitting range of the point light source 13 is usually between 30° and 120°. In this embodiment, the bisector line A of the light emitting range of the point light source 13 is directed towards a plane in which the top surface 102 of the light guide plate 10 is located; and further, the bisector line A of the light emitting range of the point light source 13 may be perpendicularly directed towards the plane in which the top surface 102 of the light guide plate 10 is located. The point light source 13 is disposed on a surface of the PCB 14, and may be fixed to the surface of the PCB 14 through soldering for example. When the point light source 13 operates to emit light, heat is generated and most of the heat is conducted to the PCB 14 and further dissipated through the PCB 14. In this embodiment, the PCB 14 is disposed on the backplate 12 directly, and this facilitates timely dissipation of the heat generated by the point light source 13 towards the outside of the backlight module 1.

The baffle 15 is disposed above a side of the point light source 13 that is away from the side surface 106 of the light guide plate 10, and the baffle 15 comprises a reflective surface 152 adjacent to the point light source 13. In this embodiment, the reflective surface 152 is a flat mirror surface inclined at an acute angle with respect to the side surface 106. As an example, a mirror reflective material may be coated on the reflective surface 152 to impart the reflective surface 152 a better reflectivity. As another example, a mirror reflective sheet may be directly attached to the baffle 15 to achieve a better reflection effect. In this embodiment, a top portion of the reflective surface 152 makes contact with the side surface 106 of the light guide plate 10; i.e., an upper end of the baffle 15 covers an exit (not shown) of the backlight module 1 at the top surface 102 of the light guide plate 10, thereby preventing the light emitted by the point light source 13 from leaking from the exit. In this embodiment, the reflective surface 152 includes an angle of 45° with the side surface 106 of the light guide plate 10, so the light emitted from the point light source 13 can be reflected by the reflective surface 152 to be redirected into the light guide plate 10.

In the backlight module 1 of the present disclosure, a main heat dissipation path for the heat generated by the point light source 13 is from the point light source 13 to the PCB 14 and then to the backplate 12; and because the aluminum extruded piece is omitted, the heat can be dissipated without the need of additionally passing through a side edge of the aluminum extruded piece and a bottom surface of the aluminum extruded piece, thus significantly improving the heat dissipation efficiency and the heat dissipation speed. Next, the thicknesses of the point light source 13 and the PCB 14 add to each other in a direction parallel to the side surface 106 of the light guide plate 10 and the point light source 13 has a width smaller than the thickness thereof, so the whole width of the backlight module 1 can be reduced, which is in conformity with the development tendency towards a narrow frame. Moreover, because the point light source 13 is not disposed opposite to the side surface 106 of the light guide plate 10 directly, no accidental collision will occur between the point light source 13 and the light guide plate 10 when the backlight module 1 is handled or impacted. As a result, the point light source 13 is protected.

Figure 3:
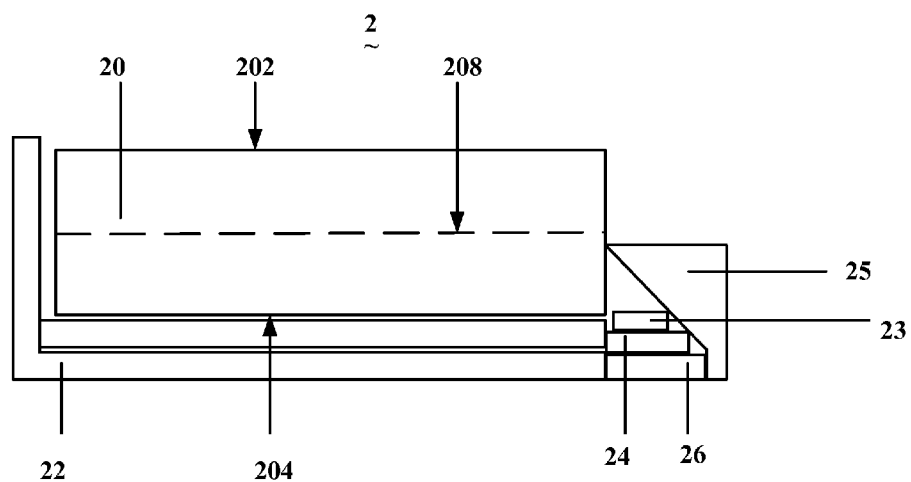
FIG. 3 is a schematic side view of a second embodiment of the backlight module according to the present disclosure.

Referring to FIG. 3, there is shown a schematic side view of a second embodiment of the backlight module according to the present disclosure. The backlight module 2 has a structure similar to that of the backlight module 1 of the first embodiment except that: a PCB 24 of the backlight module 2 is fixed together with an aluminum extruded piece 26 which makes contact with a backplate 22. Furthermore, a point light source 23 in this embodiment is a narrow type LED, which has a height smaller than that of a common LED; and a top portion of a baffle 25 is located between a bottom surface 204 and a bisector plane 208 of a light guide plate 20. The bisector plane 208 of the light guide plate 20 is parallel to a top surface 202 of the light guide plate 20 and located at a half thickness of the light guide plate 20. In this embodiment, a bisector line (not shown) of a light emitting range of the point light source 23 is directed towards a plane in which the top surface 202 of the light guide plate 20 is located. Further, the bisector line of the light emitting range of the point light source 23 may be perpendicularly directed towards the plane in which the top surface 202 of the light guide plate 20 is located.

Figure 4:
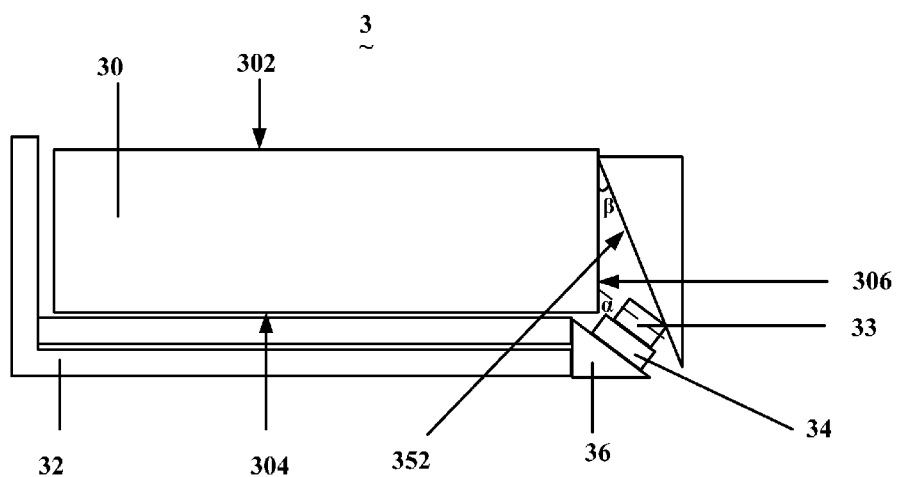
FIG. 4 is a schematic side view of a third embodiment of the backlight module according to the present disclosure.

Referring to FIG. 4, there is shown a schematic side view of a third embodiment of the backlight module according to the present disclosure. The backlight module 3 has a structure similar to that of the backlight module 1 of the first embodiment except that: a bisector line (not shown) of a light emitting range of a point light source 33 of the backlight module 3 is directed away from a plane in which a side surface 306 of a light guide plate 30 is located; i.e., the bisector line of the light emitting range of the point light source 33 is directed towards a plane in which a top surface 302 of the light guide plate 30 is located and includes an acute angle with a plane in which a bottom surface 304 of the light guide plate 30 is located. The point light source 33 is fixed to a PCB 34 which is further fixed together with an aluminum extruded piece 36 and, in turn, the aluminum extruded piece 36 makes contact with a backplate 32 of the backlight module 3. A sum of an inclination angle α of the point light source 33 with respect to the bottom surface 304 of the light guide plate 30 and an inclination angle β of a reflective surface 352 of a baffle 35 with respect to the bottom surface 304 of the light guide plate 30 is 90°. The backlight module 3 of this structure can meet a higher requirement on the narrow frame and reduce muras occurring at the side surface 306 of the light guide plate 30.

Figure 5:
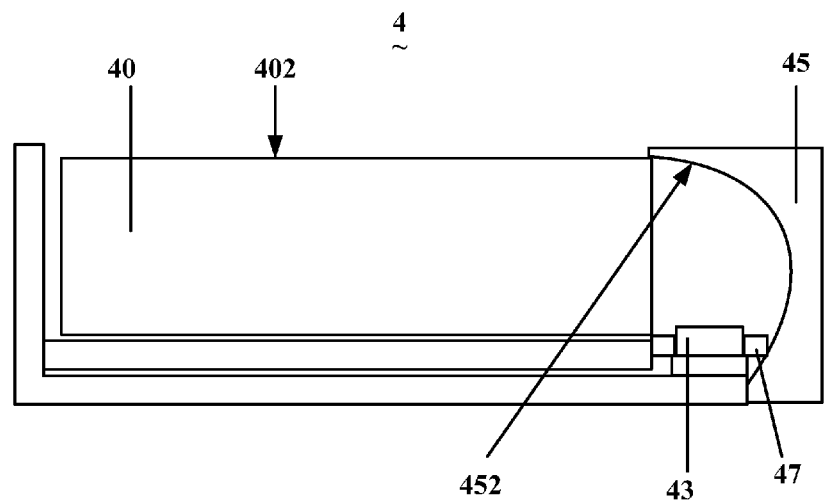
FIG. 5 is a schematic side view of a fourth embodiment of the backlight module according to the present disclosure.

Referring to FIG. 5, there is shown a schematic side view of a fourth embodiment of the backlight module according to the present disclosure. The backlight module 4 has a structure similar to that of the backlight module 1 of the first embodiment except that: a bisector line (not shown) of a light emitting range of a point light source 43 of the backlight module 4 is directed towards a plane in which a top surface 402 of a light guide plate 40 is located, and further, the bisector line of the light emitting range of the point light source 43 may be perpendicularly directed towards the plane in which the top surface 402 of the light guide plate 40 is located; another reflective sheet 47 is further disposed around side edges of the point light source 43 below the light emitting range; and a reflective surface 452 of a baffle 45 is a parabolic surface, and the point light source 43 is disposed at a focus of the parabolic surface. After being reflected by the reflective surface 452, light emitted from the point light source 43 can be viewed as parallel light propagating into the light guide plate 40, which can significantly reduce the in-plane chromatic aberration of the backlight module 4 and achieve an edge-lit backlight module of a larger size. Furthermore, the another reflective sheet 47 disposed around side edges of the point light source 43 below the light emitting range can improve the light utilization ratio of the backlight module 4.

Figure 6:
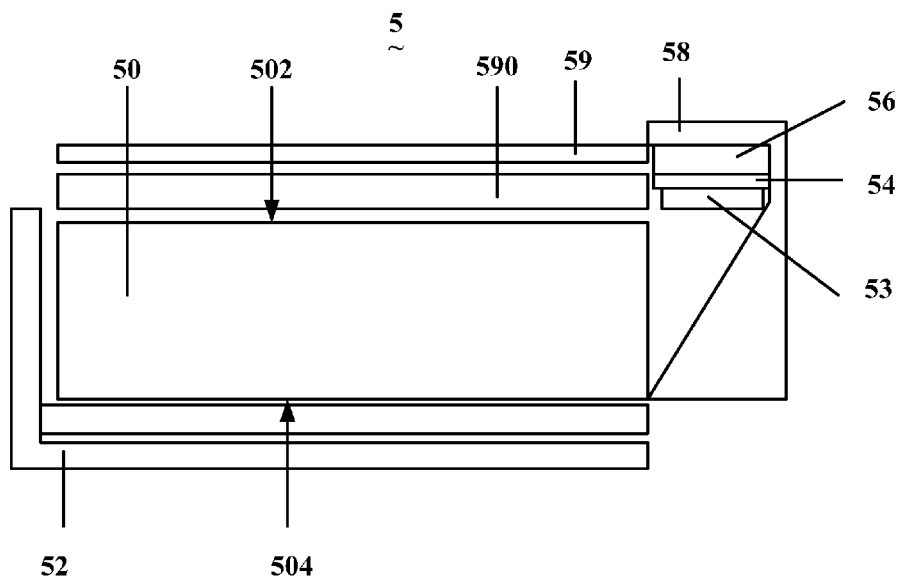
FIG. 6 is a schematic side view of a fifth embodiment of the backlight module according to the present disclosure.

Referring to FIG. 6, there is shown a schematic side view of a fifth embodiment of the backlight module according to the present disclosure. A point light source 53 of the backlight module 5 is fixed to a PCB 54 which is further fixed together with an aluminum extruded piece 56 and, in turn, the aluminum extruded piece 56 makes contact with a front frame 58. A bisector line (not shown) of a light emitting range of the point light source 53 is directed towards a plane in which a bottom surface 504 of a light guide plate 50 is located; and further, the bisector line of the light emitting range of the point light source 53 may be perpendicularly directed towards the plane in which the bottom surface 504 of the light guide plate 50 is located. The front frame 58 is mainly used to accommodate an optical diaphragm assembly 590 and an LCD panel 59 disposed in front of a top surface 502 of the backlight module 5. In this embodiment, the front frame 58 is a metal frame, and a main heat dissipation path for the heat generated by the point light source 53 is from the point light source 53 to the PCB 54, then to the aluminum extruded piece 56 and finally to the front frame 58. The backlight module 5 of this structure can meet the requirement of a low temperature of a backplate 52.

Figure 7:
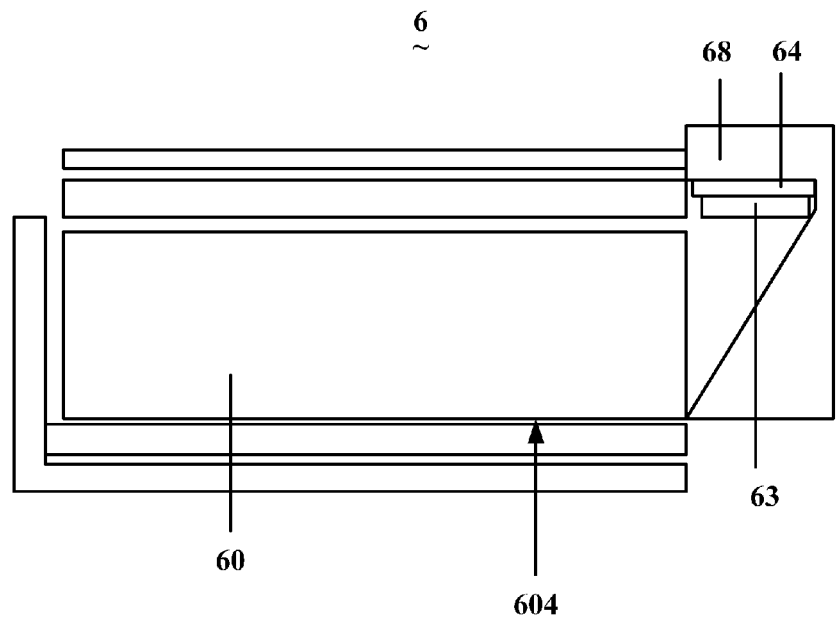
FIG. 7 is a schematic side view of a sixth embodiment of the backlight module according to the present disclosure.

Referring to FIG. 7, there is shown a schematic side view of a sixth embodiment of the backlight module according to the present disclosure. The backlight module 6 has a structure similar to that of the backlight module 5 of the fifth embodiment except that: a PCB 64 of the backlight module 6 is not fixed to an aluminum extruded piece, but makes direct contact with a front frame 68 for heat dissipation. As compared to the backlight module 5, the backlight module 6 can further improve the heat dissipation efficiency. In this embodiment, a bisector line (not shown) of a light emitting range of a point light source 63 is directed towards a plane in which a bottom surface 604 of a light guide plate 60 is located; and further, the bisector line of the light emitting range of the point light source 63 may be perpendicularly directed towards the plane in which the bottom surface 604 of the light guide plate 60 is located.

Figure 8:
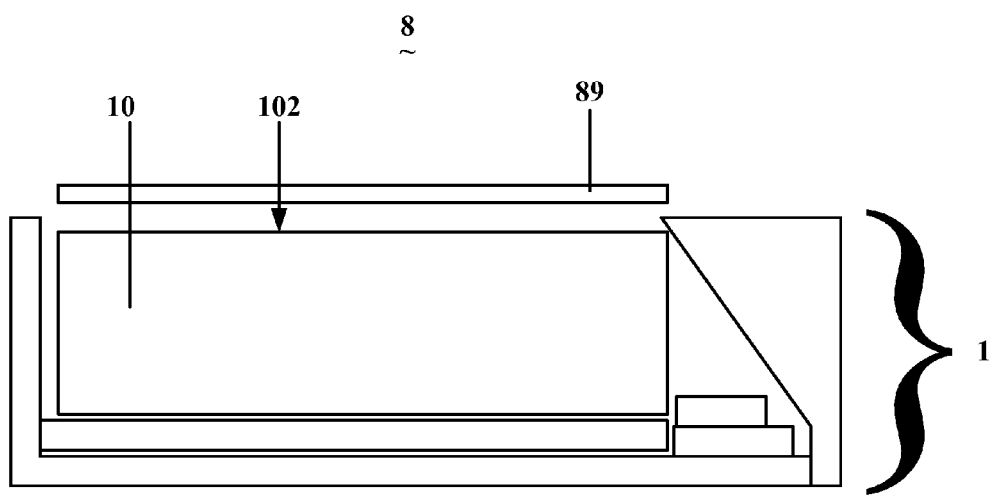
FIG. 8 is a schematic side view of an embodiment of an LCD device according to the present disclosure.

An LCD device 8 is further provided in the present disclosure. Referring to FIG. 8, there is shown a schematic side view of a preferred embodiment of the LCD device according to the present disclosure. The LCD device 8 comprises an LCD panel 89 and the backlight module 1 shown in FIG. 1. The LCD panel 89 is disposed in front of the top surface 102 of the light guide plate 10 in a light exiting direction, and the light emitted from the backlight module 1 illuminates the LCD panel 89. In other embodiments, the backlight module 1 may also be replaced with any one of the backlight modules 2 to 6 shown in FIG. 3 to FIG. 7.

As compared to the prior art, the backlight module and the LCD device of the present disclosure have the thicknesses of the point light source and the PCB superposed on each other in a direction parallel to or inclined with respect to a side surface of the light guide plate instead of in a direction perpendicular to the side surface of the light guide plate, so the whole width of the backlight module can be effectively reduced without increasing the thickness of the backlight module, which is in conformity with the development tendency towards a narrow frame. Furthermore, by having the PCB make direct contact with the backplate or the front frame, the aluminum extruded piece is omitted, so the heat dissipation path for the heat generated by the point light source can be shortened to improve the heat dissipation efficiency. Furthermore, the thickness of the backlight module can be further reduced by using a narrow type point light source and changing a position of a top portion of the baffle. Moreover, accidental collisions are less likely to occur between the point light source and the light guide plate when the backlight module is impacted or falls off, the point light source can be effectively protected from being damaged due to collisions of the light guide plate, thereby ensuring reliability of the product.

According to the above descriptions, the backlight module and the LCD device of the present disclosure feature a narrow frame and can dissipate heat easily.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A side-typed backlight module, comprising a light guide plate, a point light source and a substrate, the light guide plate comprising a top surface and a bottom surface opposite to each other and a side surface connecting the top surface and the bottom surface, and the point light source being disposed on the substrate, wherein the backlight module further comprises a backplate and a first reflective unit, the backplate is adapted to accommodate the light guide plate, the point light source is disposed beside the side surface, a bisector line of a light emitting range of the point light source is directed towards a plane in which the top surface of the light guide plate is located, and the first reflective unit is disposed outside the light guide plate, separated from the light guide plate, and adapted to reflect light beams emitted from the point light source into the light guide plate via the side surface, the light guide plate receives the light beams from the side surface and emits the light beams from the top surface thereof, a top portion of the first reflective unit is located between the bottom surface of the light guide plate and a bisector plane of the light guide plate, and the bisector plane of the light guide plate is parallel to the top surface of the light guide plate and located at a half thickness of the light guide plate, the top portion of the first reflective unit is in contact with the side surface of the light guide plate to prevent the light beams emitted from the point light source from leaking, and the point light source comprises a bottom portion below the bottom surface of the light guide plate and a top portion slightly higher than the bottom surface of the light guide plate.

2. The backlight module of claim 1, wherein the bisector line of the light emitting range of the point light source is parallel to or includes an acute angle with a plane in which the side surface of the light guide plate is located.

3. The backlight module of claim 1, wherein the substrate comprises a printed circuit board (PCB) and an aluminum extruded piece in contact with each other, and the point light source and the aluminum extruded piece are located at two opposite sides of the PCB respectively.

4. The backlight module of claim 1, wherein the backplate is a metal backplate.

* * * * *